July 9, 1968 A. BAKER ET AL 3,391,596
GRAVITY REFERENCE MIRROR SUPPORTED BY AIR BEARING
Filed Jan. 8, 1964
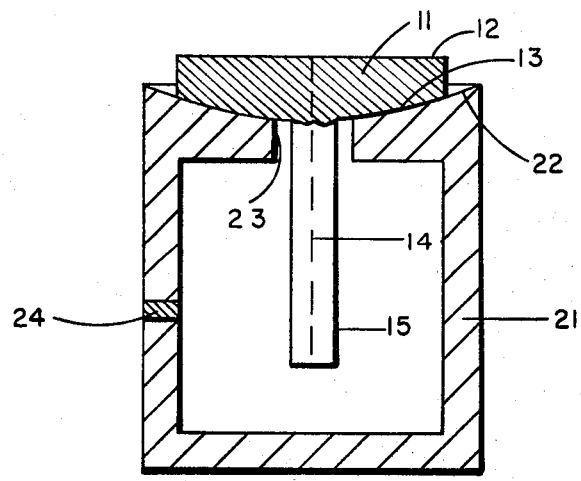
FIG. 1
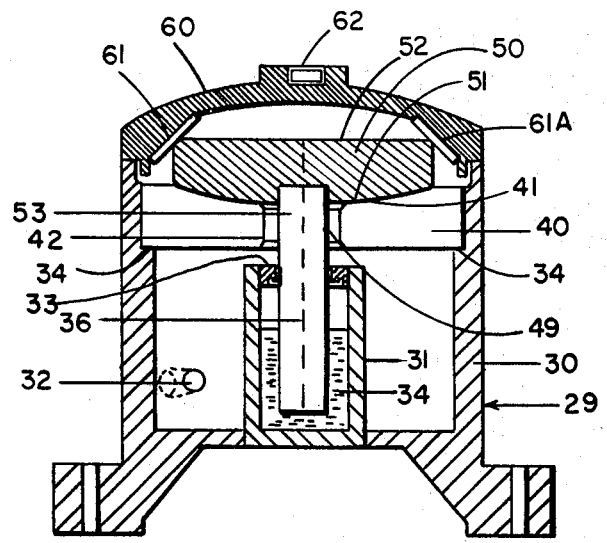
FIG. 2
INVENTOR.
ALLISTER BAKER
BY CHARLES R. ELLIS
ATTORNEY United States Patent Office 3,391,596
Patented July 9, 1968

3,391,596
GRAVITY REFERENCE MIRROR SUPPORTED
BY AIR BEARING
Allister Baker, Denville, and Charles R. Ellis, Andover,
N.J., assignors to Keuffel & Esser Company, Hoboken,
N.J., a corporation of New Jersey
Filed Jan. 8, 1964, Ser. No. 336,534
1 Claim. (Cl. 88—1)

ABSTRACT OF THE DISCLOSURE

An apparatus for defining a plane with respect to a gravity vector which includes a closed housing having a concave spherical seat in the top thereof with an aperture therethrough and a crown having a convex spherical mating surface seating in the concave seat of the housing and with the crown having a stem extending through the opening in the housing with means to provide a flow of liquid such as air into the housing and out through the opening at the top to provide a fluid bearing for the crown whereby the crown may oscillate about a center spaced above the housing and the crown a substantial distance so that the crown and stem will assume a definite position with respect to the gravity vector.

---

The present invention relates to reference plane determinations, and refers more particularly to an apparatus for defining a plane with reference to a gravity vector.

The determination of a plane perpendicular to a gravity vector at a given site has been difficult to accomplish with available instruments because of friction, vibration of liquid surfaces and parts, or corrosion of various liquid reflecting surfaces such as mercury. These disadvantages are overcome by means of the present invention which utilizes a fluid bearing.

One object of the present invention is to provide an apparatus for defining a plane with reference to a gravity vector which overcomes the disadvantages of the prior art.

Another object is to provide an apparatus for defining a plane perpendicular to a gravity vector at a given point by means of a fluid bearing.

Other objects will be apparent in the course of the following specification.

The objects of the present invention may be realized by means of a fluid bearing comprising a gravity-responsive, plane-defining element supported by fluid during use and a base which supports the element when not in use and directs fluid during use. Oscillations of the fluid-suspended element may be damped by damping fluid.

In the drawings:

FIGURE 1 is a diagram showing the relationship of a gravity-responsive, plane-defining element and a base; and FIGURE 2 is a side sectional view of one embodiment of a gravity-responsive, plane-defining apparatus of the present invention.

The present invention will appear more clearly from the following detailed description when taken in connection with the accompanying drawings, by way of example, preferred embodiments of the inventive idea.

In FIGURE 1, a gravity-responsive, plane-defining element 11 sits on a base housing 21 which has an upper seat surface 22. The housing 21 is fluid-tight except for a first opening 23 in the center of the upper seat surface 22, and a second opening 24 located elsewhere on the housing 21. The element 11 has a plane-defining surface 12 and a lower seat surface 13 precisely fitting the upper seat surface 22 of the housing 21. The element 11 is carefully balanced about the longitudinal axis 14 of a gravity-responsive stem 15 extending from the lower seat surface 13 of element 11. Stem 15 extends through opening 23 into the interior of housing 21 without restriction.

The center of gravity of element 11 must lie on axis 14 at a point below the lower seat surface 13. The axis 14 may intersect the plane-defining surface 12 as in FIGURE 1 where it is perpendicular to that surface or the axis may be parallel to the plane-defining surface as where the plane is vertically disposed. Thus it is evident that all planes from those perpendicular to those parallel to the axis 14 may be obtained by the proper design of element 11.

In operation, clean fluid is pumped into the housing 21 through opening 24 at a uniform rate. When the pressure is sufficient to lift element 11, fluid escapes from the opening 23 around the stem 15 along the interface of surface 22 and surface 13 toward the outer perimeter of the interface. Element 11 is thus supported on a layer of fluid. Since the coefficient of friction is very low, element 11 is free to adjust itself with respect to gravity. This is accomplished by gravity-responsive stem 15 of the fluid-suspended element 11. Thus the plane of surface 12 of element 11 is defined with respect to the gravity vector of stem 15 of the same element 11. In FIGURE 1, the plane is perpendicular to the gravity vector and may be used as a horizontal reference plane.

The fluid may be a liquid or a gas with a low coefficient of friction. Where the fluid is a gas or air, it is preferable to include damping means to eliminate vibration of the element with respect to the support means. Clean compressed air is preferably used.

In FIGURE 2, a gravity reference unit 29 of the present invention comprises a mounted base 40 and a gravity-responsive, plane-defining element 49. Element 49 comprises a crown 50 and a stem 53. The base 40 is mounted in the upper end of a vertically disposed cylindrical mount 30 on an internal shoulder 34. The base 40 has an accurately ground, spherical, concave upper surface 41, and the crown 50 has an accurately ground, spherical, convex lower surface 51 precisely fitting the concave upper surface 41 of the base 40. The upper surface 52 of the crown 50 is a plane-defining surface that may be reflective. The base 40 has a vertical opening 42 extending through its center and providing access to the interior of the mount 30. At the center of the bottom of the cylindrical mount 30 is a container 31 for confining a damping fluid 34. A gravity-responsive stem 53 mounted on the bottom of the crown 50 extends through the opening 42 into the damping fluid 34 confined in container 31. The longitudinal axis 36 of stem 53 intersects the plane of upper surface 52 of the crown 50. In FIGURE 2, the plane of surface 52 is perpendicular to axis 36. The center of gravity of element 49 is located on axis 36 at a point below surface 51. A splash ring 33 may be mounted at the upper end of container 31 to confine damping fluid 34 without restricting lateral movement of stem 53. Mount 30 has an air inlet opening 32 located on its side. Opening 32 may also be located on the bottom of the mount 30.

A cover 60 protects unit 29 when not in use. Resilient bumpers 61 and 61A mounted on the inner surface of cover 60 contact crown 50 for protection. Cover 60 may be clamped to mount 30. An air bubble level 62 mounted on the center upper surface of cover 60 is used for coarse leveling adjustments of unit 29. Leveling screws, not shown, may be used to tilt mount 30 for leveling adjustments.

The crown 50 is balanced carefully about the longitudinal axis 36 of the stem 53. This is accomplished by grinding off excess crown material from the edge or by loading weights into pockets drilled into the edge of crown 50. Crown 50 is preferably balanced to produce less than ±0.5 arc seconds of deflection of a vertical line of sight from reflecting upper surface 52.

The crown 50, stem 53, and base 40 are preferably made of corrosion-resistant material such as quartz.

The gravity reference unit 29 of the present invention is used to define a plane perpendicular to a gravity vector at a given point. The unit 29 is first coarsely leveled at the site by means of the leveling screws with reference to air bubble level 62. The cover 60 is removed, and clean air is pumped into the mount 30 through opening 32 at a uniform rate. When the air pressure becomes sufficient to lift the element 49 from base 40, an air layer is formed at the interface of the upper surface 41 of the base 40 and bottom surface 51 of crown 50. Element 49 is then free to adjust its position with respect to gravity by means of gravity-responsive stem 53. Oscillations of stem 53, and thus of element 49, are damped by damping fluid 34. Since the upper surface 52 of the crown 50 is perpendicular to axis 36 of stem 53, and since crown 50 and stem 53 are carefully balanced to avoid undesirable tilting, upper surface 52 of crown 50 defines a plane perpendicular to the gravity vector established by stem 53 of element 49. This plane is utilized for reference purposes in optical and electro-optical instruments.

When unit 29 is in operation, the only exit for air pumped into mount 30 is between the two matched surfaces. The air travels from the center opening 42 around stem 53 to the circumference of the spherical surfaces, thus lifting element 49 on an air cushion or boundary layer between the two surfaces. Since the surfaces are perfectly matched, a relatively small amount of air depending upon the weight of element 49 and the spherical radius of the surfaces is required to support element 49.

Since friction is low, element 49 is hypersensitive to vibrations which cause it to oscillate and rotate. These vibrations are damped by the effect of damping fluid 34 on stem 53. Stem 53 may have a ground surface for good adhesion by fluid 34 which has a viscosity sufficient to keep the crown from oscillating without significantly altering the accuracy of the readings. A suitable fluid is silicone oil.

It is apparent that the present invention is capable of many variations and modifications. All such variations and modifications are to be included within the scope of the present invention.

What is claimed is:
1. An apparatus for defining a plane with reference to a gravity vector which comprises:
   a hollow substantially closed housing having an accurately ground, spherical, concave upper seat surface, said housing being air-tight except for a first opening in the center of said upper seat and a second opening in the side of said housing;
   a gravity-responsive, plane defining element consisting of a crown and a gravity-responsive stem;
   said crown sitting on said upper seat surface of said housing and liftable therefrom by air, said crown having a flat reflecting upper surface and an accurately ground, spherical convex lower surface precisely fitting said upper seat surface of said housing, said concave and convex surfaces having a common center of curvature spaced a substantial distance above the upper surfaces of said housing and crown;
   said stem of said plane-defining element being a cylindrical shape and extending radially from the lower spherical surface of said crown through the said first opening of said housing, said stem being of lesser diameter than the said first opening, the axis of said stem being perpendicular to the upper surface of said crown and coincident with the center of gravity of said plane-defining element;
   a container mounted in said housing surrounding the lower part of said stem; and
   damping fluid in said container immersing the lower end of said stem, said fluid having a viscosity sufficient to eliminate oscillations of said stem with respect to said housing without significantly altering movement of said stem;
   whereby air pumped into said housing through the second opening escapes from the first opening by lifting the crown and the stem from said housing, which lifting allows said plane-defining element to pivot about said center of curvature to a position which establishes a gravity vector perpendicular to the upper surface of said crown, thereby defining a plane perpendicular to a gravity vector.

References Cited
UNITED STATES PATENTS

| | | | |
|---|---|---|---|
| 753,445 | 3/1904 | Stratton | 88—1 |
| 3,016,500 | 2/1912 | Hinz | 88—1 |
| 2,695,198 | 11/1954 | Brugger. | |
| 2,934,824 | 5/1960 | Braybrook. | |
| 2,966,744 | 1/1961 | Mueller. | |
| 3,012,827 | 12/1961 | Goetz. | |
| 3,280,691 | 10/1966 | Olsen et al. | 88—1 |

DAVID H. RUBIN, *Primary Examiner.*

T. H. KUSMER, *Assistant Examiner.*